2 Sheets—Sheet 1.
W. ATKINSON.
DREDGING AND EXCAVATING MACHINE.
No. 39,194.        Patented July 7, 1863.
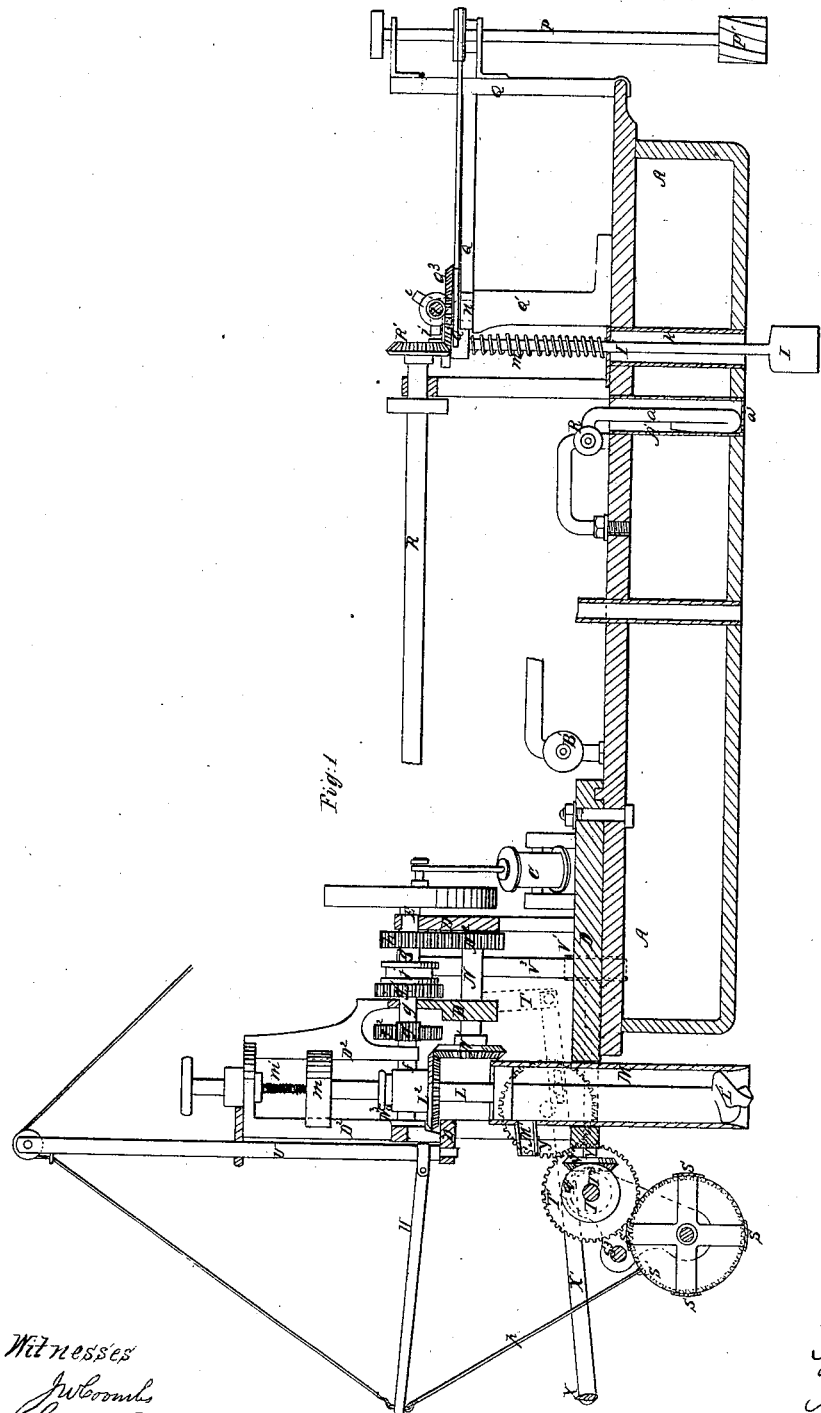

2 Sheets—Sheet 2.
W. ATKINSON.
DREDGING AND EXCAVATING MACHINE.
No. 39,194. Patented July 7, 1863.
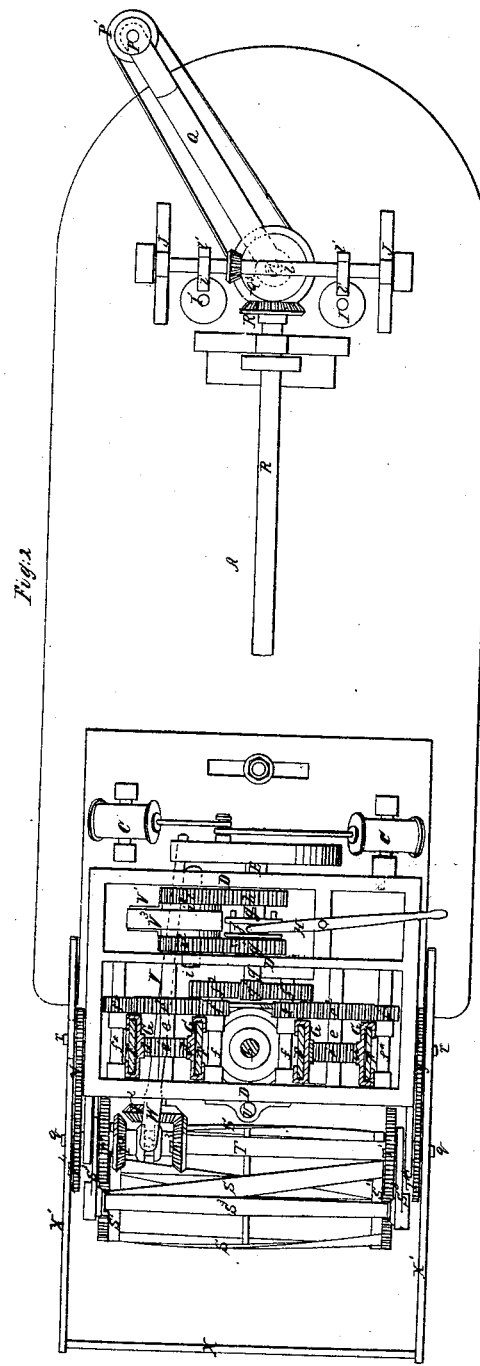
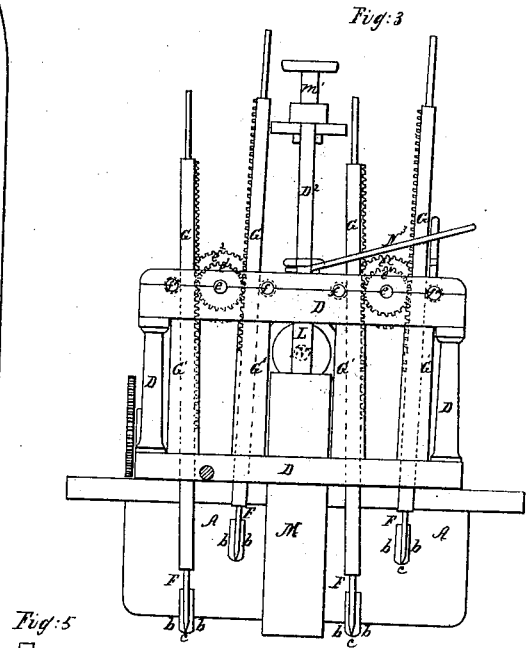
Witnesses
Inventor
W. Atkinson

UNITED STATES PATENT OFFICE.

CHARLES ATKINSON, OF MOLINE, ILLINOIS, AND JOSEPH ATKINSON, OF NEWBURY, VERMONT, EXECUTORS OF WILLIAM ATKINSON, DECEASED, LATE OF BROOKLYN, NEW YORK.

IMPROVED DREDGING AND EXCAVATING MACHINE.

Specification forming part of Letters Patent No. 39,194, dated July 7, 1863.

*To all whom it may concern:*

Be it known that we, CHARLES ATKINSON, of Moline, in the county of Rock Island and State of Illinois, and JOSEPH ATKINSON, of Newbury, in the county of Orange and State of Vermont, are the executors of WILLIAM ATKINSON, deceased, late of the city of Brooklyn, in the county of Kings and State of New York, and that the said WILLIAM ATKINSON invented certain new and useful Improvements in Apparatus for Dredging, Excavating, and Ditching; and we do hereby declare that the following is a full, clear, and exact description of the same, reference being had to the accompanying drawings, forming part of this specification, in which—

Figure 1 is a vertical longitudinal section of a boat having the improvements applied. Fig. 2 is a plan of the same. Fig. 3 is an end view of the same. Figs. 4 and 5 are views illustrating some of the details of the apparatus.

Similar letters of reference indicate corresponding parts in the several figures.

These improvements are more especially designed to be applied in combination with an apparatus termed a "suction dredging-boat," for which an application for Letters Patent of the United States was allowed to the said William Atkinson on the 26th day of April, 1862, their object when so applied being to cut, bore, pick, break, and tear up all obstructive deposits of mud, sand, clay, and other matter from the beds of rivers, harbors, docks, and other waters, or to deepen the same, and to cut and break up turf and earth in swamps and marshes and other places, and reduce all such substances and material to a soft or pulpy or sufficiently diluted condition, or get them so mixed with water as admit of their removal by the pumps of that apparatus; also, for cutting ditches and canals, and for forming dikes or embankments, and filling up lots and improving swamps and marshes and other low lands, and bringing them to the grade of uplands for cultivation, by depositing upon such swamps, marshes, or low lands the material taken up in cutting the ditches or canals, or taken from the adjacent waters. The said improvements may, however, be used in connection with any other kind of boat for the purpose of bringing such matters and substances, as above specified, to a condition to be removed by the action of a natural current, or of the tide, or by any other suitable means; and in some instances the said improvements might be arranged upon a carriage to run upon land, when a stream of water may be obtained to effect or facilitate the carrying away or removal of the material, which is loosened by the cutting, boring, picking, breaking, and tearing-up operations.

To enable others to make and apply the invention, we will proceed to describe its construction and operation.

A represents a vessel, which may be supposed to be constructed and fitted up with pumps and filters or strainers and other appliances, like the suction dredging-boat, which forms the subject of WILLIAM ATKINSON'S before-mentioned application for Letters Patent.

B B' represent two of the pumps for collecting the deposits or other matters and delivering them into the boat.

The suction-pipe $a$ of the pump B, instead of passing over the side of the boat, as described in the specification of the before-mentioned application for Letters Patent, passes down through a well, A', provided in the vessel A, and is thus enabled to take up the material from directly under the vessel's bottom.

The suction-pipes of all the pumps may be arranged in a well or wells of this kind, and when the pipes are not in use they are drawn up into the well or wells, and the latter closed at the bottom by a scuttle, $a'$, to make the vessel's bottom present an unbroken surface and facilitate its propulsion.

C C represent a pair of oscillating engines, which may be the same employed for the propulsion of the boat and working of the pumps or used independently of the propelling and pumping apparatus, to work the cutting, picking, boring, breaking, and tearing machinery. These engines may be either directly connected or geared with the shafts of the above mentioned machinery.

F F, Figs. 1, 2, and 3, are spade-like digging or cutting instruments, having attached to them additional cutters, $b$ $b$, arranged at right angles to their principal edges $c$ $c$, as best shown in the edge view, Fig. 4. These instruments are fitted into slide-frames G G, in which they are capable of adjustment higher or lower, to enable them to operate in water of a greater or less depth and cut to a greater or less depth, and secured by set-screws or other means; and these slide-frames are arranged in guides G' G' in a frame, D, which is erected upon one end of the boat to carry the cutters F F and the shafting and gearing for operating the same, and others of the contrivances used for bringing the substances to be removed to a proper condition, the part of the frame which contains the guides G G overhanging the end of the boat, and the said guides being set vertically or at any angle, as may be most desirable to enable the cutters, which work over the end of the boat, to cut up grass, clay, or other tough material in the bed of a river, harbor, or other water, so that it may be removed by pumps and deposited to form embankments or otherwise disposed of, or be removed by a current or by any other means. The said slide-frames and cutters may be arranged in a row in such number that the said cutters may be used to cut into any bank or marsh toward which the boat may be headed and form a canal of the whole width of the boat, into which the boat may be propelled as the cutting is proceeded with, and the material cut away removed by the pumps or other means. The slide-frames are furnished with toothed racks $d\ d$ to enable them to be operated by spur gears $e\ e'$ on horizontal shafts $e\ e$, and the said slide-frames being arranged in pairs, one on each side of one of the gears $e'\ e'$, half of the said slides are descending to drive their cutters into the earth or other substance to be cut up, while the other half are rising, and by reversing the revolution of the shafts $e\ e$ and gears $e'\ e'$ periodically the operations of the several cutters are reversed and the several cutters are caused to have a reciprocating motion, one of each pair rising while the other is descending.

The shafts $e\ e$ are operated as follows: Each is furnished with a gear, $e^2$, which gears with a pinion, $f$, on one of two shafts, $f f$, arranged parallel with $e'\ e'$. The latter shafts are also furnished with spur-gears $f^2 f^2$, gearing with a pinion, $g'$, on a shaft, $g$, which is in line with the crank-shaft E of the engines C C, and fitted to the end of the latter shaft, so that the two, though working independently of each other, are mutually supporting. The shaft E, which, like $g$, works in bearings in the frame D, is geared by a pair of spur-gears, $h\ i'$, with a shaft, $i$, and the latter shaft is also furnished with a fast spur-gear, $i^2$, which gears with a spur-gear, $g'$, which is fitted to turn loosely on the shaft $g$. Between the gears $g'$ and $h$ there is arranged upon the shaft $g$ a sliding clutch, $j$, which turns with but not on the shaft, and this clutch is connected with a hand-lever, H, by which to bring it into gear with $g$ or $h$. When the clutch $j$ is in gear with $g'$, the shaft $g$ derives motion from $h$ through $i\ i^2$ and $g'$; and the pinion $g'$ drives the shafts $e\ e$ through the intermediate gearing and shafting, but by shifting the clutch $j$ to the gear $h$ the shaft $g$ is directly connected with the crank-shaft E, and the direction of its revolution is reversed, producing a reversal of the revolution of the gears $e\ e$, and reversing the movement of the cutters; hence by shifting the clutch $j$ at regular intervals the cutters are severally caused to have a reciprocating movement. The shifting of the clutch may be effected automatically by means of tappets upon the cutter slide-frames, the adjustment of the tappets at different distances apart serving to regulate the length of the upward and downward movement of the cutters and the depth of the cut. The slide-frames are supported opposite the shafts $e\ e$, either by the shafts, $f f$ or by corresponding shafts, $f^* f^*$, as shown in Fig. 2, the latter being geared with the gears $e^2\ e^2$ by pinions $f'^*\ f'^*$, and these shafts $f f$ and $f^* f^*$ may be furnished with pinions to gear with racks on the backs of the slide-frames.

To enable the cutters to be moved transversely to the vessel to repeat their operations at suitable distances in a transverse direction, or, in other words, to give them a transverse feed, the frame D is arranged to travel back and forth transversely to the vessel and to permit this the engines should be upon the said frame, and by this means cutters may, after the vessel's head has been run up to a bank or swamp, be made to cut a canal or ditch of the full width of or wider than the vessel itself. This transverse feed movement may be produced automatically by any suitable mechanism, and should take place at the time when the upward and downward movements of the several cutters are changed.

I I, Fig. 1, are spade-like cutters, operated in a manner different from F F. These cutters are attached to shafts or bars I' I', Figs. 1 and 2, which may be arranged either vertically or at any inclination to work through a well or wells, $k$, in the vessel, and the said shafts are lifted at regular intervals by means of nippers $l'\ l'$, or their equivalents, attached to a shaft, $l$, arranged in bearings in suitable standards, J J, and are afterward allowed to drop by their own weight, or forced down by springs $m\ m$. The said shafts are also turned continuously or intermittently.

K, Fig. 5, is a cutter of a similar character to a rock-drill, for operating on harder material than the spade-like cutters. This cutter is attached to a bar or shaft, K', which may be applied in place of the shafts I' I', and operated in a similar manner; or the cutters I I may be detached from the said shafts I' I', and the cutters K K put in their places.

L, Figs. 1, 2, and 3, is a shaft, which may be arranged vertically or at any inclination, in suitable bearings in the frame D, beyond the end of the vessel. This shaft has secured to its lower end an auger-like boring-tool, L', or a rotary cutter or series of cutters of any construction or form suited to the character of the bed or material in which it is intended to operate. The upper bearing, $m$, of this shaft is fitted to slide up and down in suitable ways, $D^2 D^2$, erected on the frame D, and has a feed-screw, $m'$, applied to it in such manner that by turning the said screw the said bearing may be moved down and up, and the boring-tool $L'$ may thereby be pressed into or drawn out of the material. The lower bearing of the said shaft is in the head of a stationary cylinder, M, secured to the frame D. The said shaft is fitted above the cylinder M with a bevel-gear, $L^2$, which is arranged to gear with a bevel-gear, $N'$, on a shaft, N, which is geared by a spur-gear, $N^2$, with the gear $h$ on the crank-shaft E of the engine, for the purpose of producing the rotary motion of the shaft L and tool $L^2$.

To enable the shaft L to slide longitudinally within the hub of the bevel-gear $L^2$, and yet insure its rotation with the said wheel, the said shaft is made with a longitudinal groove for the reception of a spline secured in the hub of the bevel-gear.

To enable the bevel-gear $L^2$ to be easily brought in and out of gear with the bevel-gear $N'$, to start and stop the operation of the tool $L'$, the first-mentioned bevel gear is arranged to slide up and down under the control of a lever, $N^3$.

When the tool $L'$ is used for boring, the cylinder M, which is open at the bottom, and adjustable vertically, is raised up above the said tool, but the said cylinder, when the tool is made of screw form, may serve another purpose—viz., by lowering it and securing it in a condition to cover the said tool the said tool combines with it to form an Archimedean screw pump, which may be used to good advantage, either separately or in combination with the spade-cutters F F, for taking up and removing deposits of mud and other substances, the said cylinder being furnished with a spout, $M'$, for the discharge of the said substances, either into the suction dredging-boat or into any other receptacle or place.

P, Figs. 1 and 2, is a shaft, having at its lower end a boring-tool, $P'$, or rotary cutter or series of cutters of substantially similar character to $L'$, or of any other suitable kind, and intended to be furnished with a feed-screw substantially like the feed-screw $m'$ applied to the shaft L. This shaft is arranged in bearings in a frame, Q, which is arranged to swing horizontally around a pivot, $n$, on a stationary post, $Q'$, erected in the center of the suction dredging-boat A, or other vessel, near one end thereof, and the said shaft overhanging the vessel is thus enabled to work completely around the end thereof, so that its tool, cutter, or cutters may be employed either at the bottom of the water in which the vessel is afloat, as for deepening the beds of, cutting through the bars of, or removing obstructions in rivers, harbors or other waters, or be made to operate upon the shore thereof, and may commence its operation at some distance above the water-line and work downward, as may be required in cutting into banks or embankments. The shaft P has rotary motion imparted to it by a belt from a pulley, $Q^2$, which is loose on the pivot $n$, and which has secured to it a bevel-gear, $Q^3$, gearing with a bevel-gear, $R'$, in a horizontal shaft, R, which may be supposed to be a continuation of the crank-shaft E of the engine or geared therewith. By the combined rotary motion of the shaft P, swinging motion of the frame Q, and screw-feed applied to the said shaft, the tool, cutter, or cutters, which it carries, may be made to cut a ditch or canal wider than the vessel A, and of a depth to receive the said vessel so that the said vessel may cut its own way through land, or into or through a marsh or swamp. The earth or material thus cut away may be removed by the pumps of the suction dredging-boat or by any other suitable means.

S S, Figs. 1 and 2, are a series of cutters, whose edges are in the form of lines drawn spirally upon a cylinder attached at their ends to two gears, $S' S'$, which are secured upon a concentric shaft, $S^2$. The said shaft, gears, and cutters may be spoken of collectively as a cutter-cylinder. The said shaft is arranged in bearings in a frame, $S^3$, which is arranged to swing upon a horizontal shaft, T, working in fixed bearings attached to the outer end of the frame D, which overhangs one end of the vessel A, and this frame is connected by one or more ropes or chains, $p$, with a derrick, U, on board the vessel, or attached to the frame D, for the purpose of raising and lowering the cutter-cylinder. The shaft T carries two spur-gears, $T' T'$, gearing with the gears $S' S'$, for the purpose of imparting a rotary motion to the cutter-cylinder, and the shaft T derives the necessary rotary motion for this purpose through a pair of bevel-gears, $T^2 T^3 V^2$, from a shaft, V, which is driven by a belt, $V^3$, from a pulley, $i^3$, on the shaft $i$ before described. The two bevel-gears $T^2 T^3$, on the shaft T are secured together and arranged to slide on the said shaft, to which they are fitted with a feather and groove, that either one may be brought into gear and the other out of gear with the gear $V^2$, for the purpose of producing the revolution of the cutter-cylinder in either direction, or that both may be brought out of gear with the gear $V^2$ to stop the revolution of the cylinder when desired. The gears $T^2 T^3$ are moved along the shaft T the necessary distance to effect the above results by means of a hand-lever, W. This cutter-cylinder may be employed for cutting or breaking up weeds, turf, and earth or mud, either on marshes or swamps or in the beds or bottoms of rivers, harbors, or other waters, and bringing them to a suitable condition to be removed by centrifugal, screw, or other pumps, or by other means. The cutter-cylinder may be lowered by the derrick to enable it to cut downward to any depth and afterward raised to cut upward, the direction of its revolution being changed before raising it; but to enable this to be done the cutters should each have two cutting-edges. When it is not desired to use this cylinder, it may be raised up by the derricks out of the way of the operation of the spade-cutters and tool L', or it may be removed altogether and taken away.

X is a cutting or chipping blade of any desirable length, secured at its ends to two arms, X' X', which derive motion either from crank-wrists $q\ q$, carried by the shaft T, or from the said wrists, and wrists $r\ r$, carried by two gears Y Y, working on studs secured in the frame D, and driven by gears $T^4\ T^4$ on the shaft T. If the crank-wrists $q\ q$ only are used, the inner ends of the arms X' X' are connected with oscillating bars Z, suspended from fixed pins, which secure them to the frame D. The said blade may have teeth like a rake, to tear up weeds, grass, or other matter, instead of a cutting edge. Its motion, produced by the means above described, will be elliptical, and may be varied by varying the position or throw of the cranks to produce a greater or less horizontal or vertical movement to make its movement partake more or less of a chopping or raking character, as may be desired, according to the character of the material to be operated upon, the said material being brought by it to a condition for being pumped into the suction dredging-boat or removed by any other means.

The several kinds of tools and appliances hereinabove specified are designed to be variously applied separately and in combination, and are adapted in form, construction, and arrangement to operate in the various ways hereinabove specified, according to the nature of the work to be performed in the removal of obstructions or deposits, and in cutting channels through bars in deeper rivers, docks, or other waters, and in cutting ditches or canals, the whole constituting an apparatus which it is believed will meet all the several requirements for such operations.

What we claim as the invention of WILLIAM ATKINSON, deceased, and desire to secure by Letters Patent, is—

1. The employment, in combination with what has been termed the "suction dredging-boat," or with any other boat or carriage, of a system of reciprocating spade-cutters, F F, operating substantially as and for the purpose herein specified.

2. The employment, in combination with the suction dredging-boat, or any other boat or carriage, of a system of reciprocating and rotating spade-cutters, I, applied to operate substantially as and for the purpose herein set forth.

3. The employment, in combination with the suction dredging-boat, or any other boat, of a system of reciprocating and rotating chisel-pointed cutters, K, applied and operating substantially as and for the purpose herein set forth.

4. The employment, in combination with the suction dredging-boat, or other boat or carriage, of a rotary boring-tool, L', applied and operating substantially as and for the purpose herein described.

5. The cylindrical casing M, applied in combination with a screw-like construction of the tool L', to form a pump, substantially as herein specified.

6. The employment, in combination with the suction dredging-boat, or any other boat or carriage, of a rotary boring-tool or system of cutters, P', arranged in a swinging carriage, Q, substantially as and for the purpose herein specified.

7. The employment, in combination with the suction dredging-boat, or any other boat or carriage, of a cutter-cylinder, carrying a series of cutters, S S, and operating substantially as and for the purpose herein specified.

8. The employment, in combination with the suction dredging-boat, or any other boat or carriage, of a chopping, cutting, or raking blade, X, applied and operating substantially as and for the purpose herein set forth.

CHARLES ATKINSON.

Witnesses to the signature of Charles Atkinson:
ELSWORTH MAPES,
G. L. ATKINSON.

JOSEPH ATKINSON.

Witnesses to the signature of Joseph Atkinson:
TAPPAN STEVENS,
HORACE B. MORSE.